United States Patent [19]
Phillips

[11] Patent Number: 4,773,662
[45] Date of Patent: Sep. 27, 1988

[54] DOUBLE-DRIVE BICYCLE

[75] Inventor: Cal M. Phillips, North Miami Beach, Fla.

[73] Assignee: Ultra M.A.C. Corp., Fort Lauderdale, Fla.

[21] Appl. No.: 31,745

[22] Filed: Mar. 30, 1987

[51] Int. Cl.⁴ ............................................. B62M 1/12
[52] U.S. Cl. .................................. 280/234; 280/230; 280/233; 280/261
[58] Field of Search ............... 280/230, 232, 233, 234, 280/261

[56] References Cited

U.S. PATENT DOCUMENTS

| | | | |
|---|---|---|---|
| 651,941 | 6/1900 | Von Wedel . | |
| 2,533,728 | 12/1950 | Gedat et al. | 280/233 |
| 3,193,305 | 7/1965 | Hendricks | 280/225 |
| 3,823,959 | 7/1974 | Winters | 280/234 |
| 3,910,599 | 10/1975 | Thomas | 280/234 |
| 4,109,927 | 8/1978 | Harper | 280/250 |
| 4,152,005 | 5/1979 | Vanore | 280/234 |
| 4,270,766 | 6/1981 | Thomas | 280/234 |
| 4,303,255 | 12/1981 | Thomas | 280/234 |
| 4,316,616 | 2/1982 | Boivin | 280/289 |
| 4,417,742 | 11/1983 | Intengan | 280/234 |
| 4,498,684 | 2/1985 | Intengan | 280/234 |
| 4,548,420 | 10/1985 | Patroni, Jr. | 280/224 |
| 4,653,613 | 3/1987 | Blancas | 188/24.11 |
| 4,685,692 | 8/1987 | Fullilove et al. | 280/234 |

FOREIGN PATENT DOCUMENTS

| | | |
|---|---|---|
| 966673 | 10/1950 | France . |
| 107848 | 2/1899 | Fed. Rep. of Germany . |
| 3239548 | 4/1984 | Fed. Rep. of Germany . |
| 454651 | 4/1968 | Switzerland . |

Primary Examiner—John J. Love
Assistant Examiner—Donn McGiehan
Attorney, Agent, or Firm—Fisher, Christen & Sabol

[57] ABSTRACT

A velocipede, for example a bicycle, having a front wheel drive is disclosed. The front wheel has a gear axially mounted thereon. In place of regular handlebars is a drive gear rotatably mounted on the upper front of a frame. The drive gear has coextensive handle means for rotating the drive gear. A first drive chain connects the drive gear to a plurality of different sized gears. A second drive chain connects the plurality of different sized gears to the gear axially mounted on the front wheel, whereby rotation of the hand means causes rotation of the front wheel. A derailleur is provided to change the position of the second chain on the plurality of different sized gears. Independently rotatable coextensive handles with cables extending to the outside allow for brake levers and derailleur levers to be mounted on the handles without becoming entangled during 360 degree rotation of the drive gear. The gear wheel is lockable to provide fixed handlebars. The bulk of the front wheel drive is mountable on a pivotable upper support which allows for a plurality of arm extensions. The invention is adaptable to conventional bicycle frames with no modification.

20 Claims, 5 Drawing Sheets

DOUBLE-DRIVE BICYCLE

This invention relates to a velocipede and in particular to a velocipede wherein the driver actuates and controls the motion of the rear wheel or wheels with foot pedals but has elevated handles which drive the front wheel.

BACKGROUND OF INVENTION

The prior art United States patents discussed below show attempts to utilize hand motion to drive the front wheel of a velocipede such as a bicycle. However, each example of the prior art has one or more disadvantages such as awkwardness, no rear drive, limitation of the driver's ability to alternate between hand driving of the front wheel with driving of the rear wheels with foot pedals, lack of simultaneous hand and foot driving or lack of choice of hand driving speeds. Further, existing velocipedes can not readily be converted into these previously described hand-drive velocipedes.

U.S. Pat. No. 651,941 shows a manual front drive, has no rear drive, shows no multiple choice of speeds, and is awkward to operate because of the position of its crank arms.

U.S. Pat. No. 2,533,728 describes a three wheel bicycle where a hand crank goes directly to the front wheel, with no drive on the rear wheel.

U.S. Pat. No. 3,193,305 has a hand crank for the front wheel drive using a single speed chain and no adjustability.

U.S. Pat. No. 3,823,959 shows a hand crank driving a single speed chain.

U.S. Pat. No. 3,910,599 lacks a rear drive.

U.S. Pat. No. 4,109,927 is a tricycle with no rear drive.

U.S. Pat. No. 4,147,742 does not have any front wheel drive.

U.S. Pat. No. 4,152,005 has awkwardly positioned drives for a tricycle.

U.S. Pat. No. 4,270,766 uses a hand crank for the front wheel but has no rear drive.

U.S. Pat. No. 4,303,255 has a single front drive, and no drive on the rear.

U.S. Pat. No. 4,316,616, relates to a wheel-chair with hand drive on the front wheel and no rear drive.

U.S. Pat. No. 4,417,742 uses a hand crank to assist the foot pedals for the rear drive.

U.S. Pat. No. 4,548,420 shows a single speed drive chain from a rotary crank to the hub of the front wheel.

One object of the present invention is to provide a velocipede, such as a bicycle, which has an independent hand drive for the front wheel.

Another object of the present invention is to modify an existing bicycle by providing a hand-driven, multiple speed front wheel drive which is independent of the rear drive and which can freewheel.

Other objects and advantages of this invention will be apparent from the description and claims which follow, taken together with the appended drawings.

SUMMARY OF INVENTION

The invention comprises broadly a velocipede such as a bicycle or tricycle which has a frame, a front wheel, one or two rear wheels and foot pedals for driving the rear wheel, where: (1) in place of the handlebars a wheel with a pair of handles is mounted on the upper front of the frame; (2) a variable free-wheeling gear set is mounted on the upper portion of the frame; and (3) a driving gear is axially mounted on the front wheel. An endless loop such as a belt or chain connects the wheel with the variable gear set. A chain connects a selected gear of the variable gear set to the front wheel driving gear through a derailleur. Means for controlling the derailleur are mounted accessible to the hands of the driver.

The requirements for converting an existing bicycle or tricycle to the present invention comprise essentially substituting another rear wheel for the front wheel and mounting the upper handle operated wheel on a special support which is preferably adjustable so as to accommodate the driver. The support which is mounted on the front of the bicycle frame can also be the location for the separate shifting control for the front wheel and the rear wheel. The brake controls are preferably mounted on the handles of the handle-operated wheel. While a specific example of the invention is described below, it should be noted that there are many variations which are considered within the scope of this invention. Thus the multiple gears which are varied by a derailleur can be any number, as for example, three to ten. Where a thee-wheel velocipede is available, the rear drive is in between the two wheels. The shifter can be located in various positions as may be convenient for the driver or in the design of the bicycle. In place of a chain it is possible to use a belt where desirable. Also, the invention is applicable both to the bicycle which brakes upon rearward motion of the pedals (such as coaster brakes) as well as those whose brakes are controlled by hand (e.g. caliper brakes).

As an option the handles on the front wheel drive system can be locked in a selected fixed position. The handle grips, with brake controls attached, are preferably on a ball bearing axis so as not to entangle the brake cables while making a 360 degree rotation in powering the front wheel. A conventional bicycle rear wheel with a sprocket can be used as the front wheel drive system and will generally fit on the standard and front fork socket of a present day bicycle. That sprocket is a freewheel type. Thus the driver can go through 360 degree rotation of his hands without changing the grip or taking his fingers off the brakes.

This invention is also applicable to the two different systems of changing the gear ratios on a bicycle, namely the variable gear hub such as a three speed hub, and the derailleur system. In a variable gear hub, gear changing is effected by means of a gear control chain worked by the control wire from a lever mounted on the handles and support. The chain shifts the sun wheels of the two planetary gear sets along the spindle of the hub. While it is preferred to use the derailleur system as illustrated in the specific example, the variable gear hub can also be used in its place in the front wheel drive system.

Another feature of the invention is that the gear wheel can be a standard two sprocket bicycle crank. The loop or chain runs off the large sprocket to the gear set. The small sprocket is used in conjunction with a bolt which locks into one of the gear teeth of the small sprocket to hold the handles in a selected position.

Another feature of this invention is that where a conventional bicycle frame is used the handlebars and stem can be removed and the socket where the stem was previously mounted can be used to hold the upper support.

It is preferred that the handle grips on the handle arms are on ball bearings so that the brake controls can be mounted on the grips. The ball bearings permit floating of the brake cables so they are not entangled and the brake control levers are easily accessible to the fingers of the driver to permit braking at any time, a significant safety improvement over the prior art.

The handles can be selectively positioned so as to have the grips for the right and left hand aligned with one another, or far apart or intermediate positions. By having selected positions, the driver is able to exercise different aspects of his arm muscles. For stability, the preferred position is where the grips are aligned (as in FIG. 4).

The brakes and shifters can be mounted near the grips of the hand wheel so as to be readily accessible to the driver. Shifting is accomplished by stopping the forward motion of the handle, shifting the gear, rotating back to operate the derailleur, and then driving.

SPECIFIC EXAMPLE OF INVENTION

Figure 1:
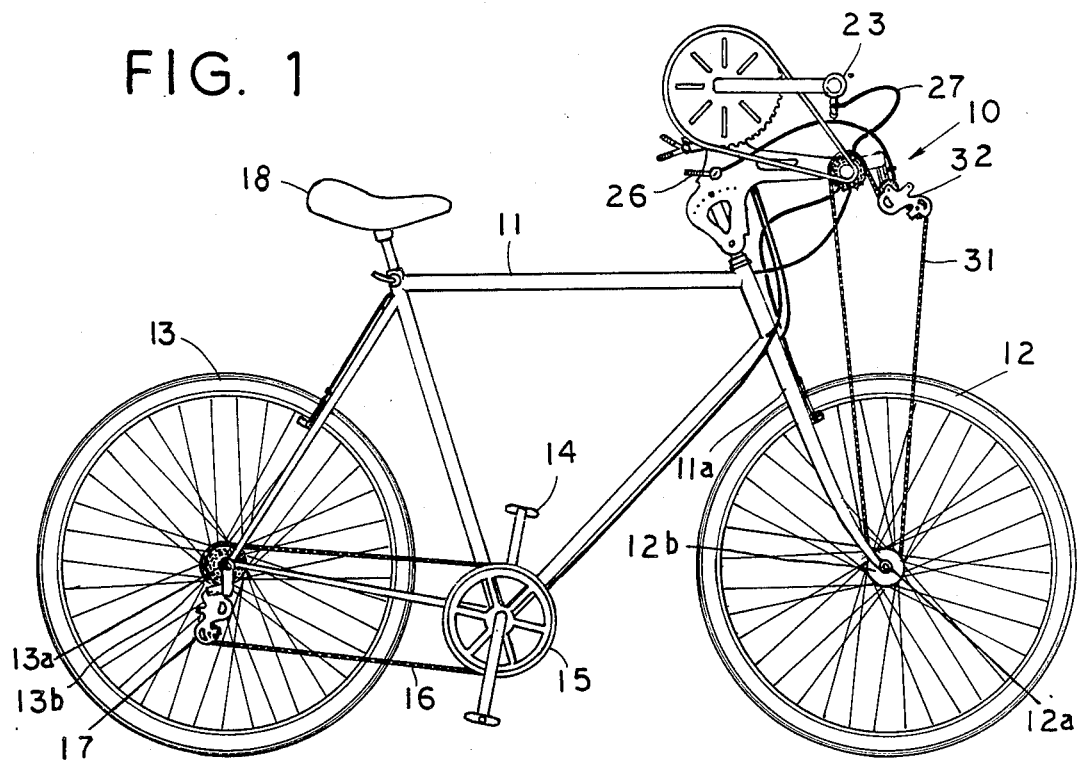
FIG. 1 is a right side view of an embodiment of this invention.
Figure 2:
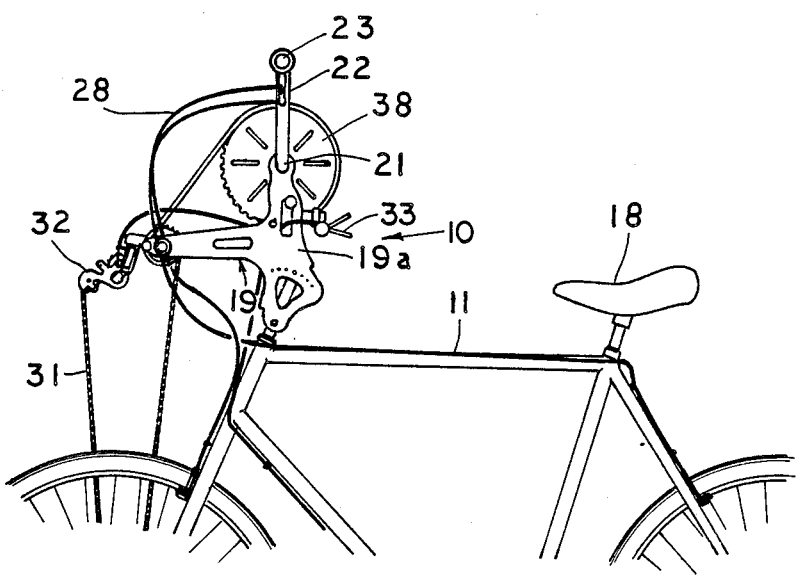
FIG. 2 is a left side upper front view of the embodiment of FIG. 1.
Figure 3:
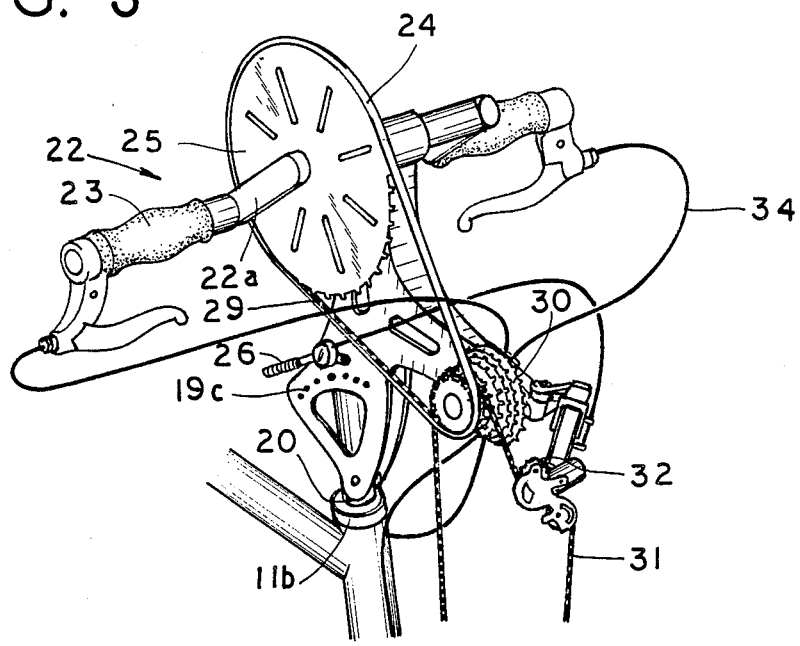
FIG. 3 is an upper three-quarter front view with cover removed of the embodiment of FIG. 1.
Figure 4:
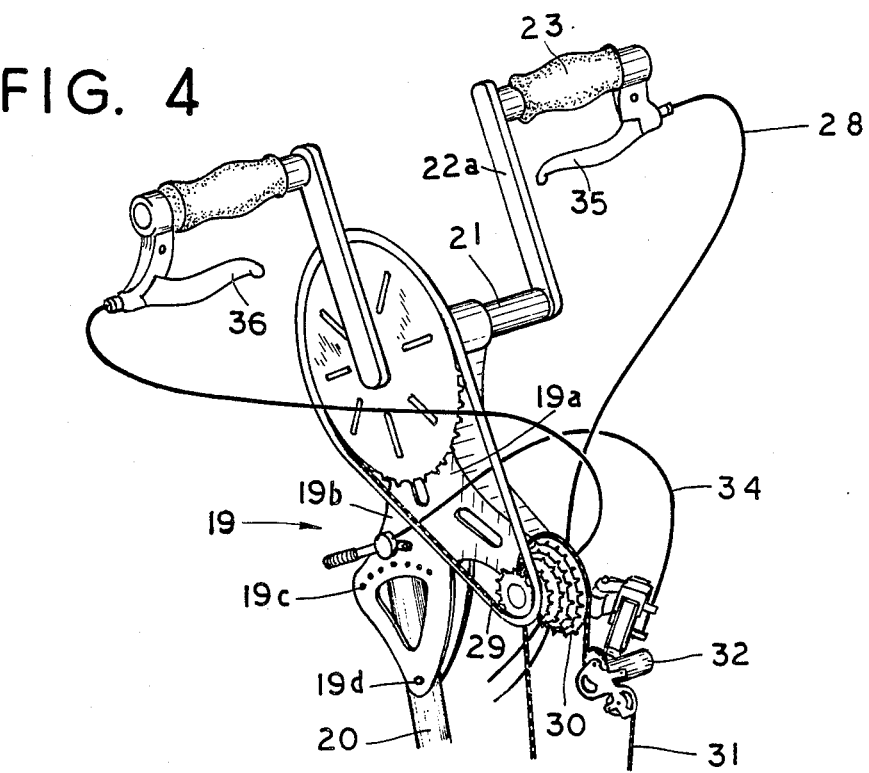
FIG. 4 is an upper front slight perspective, partial view with cover removed of the embodiment of FIG. 1.
Figure 5:
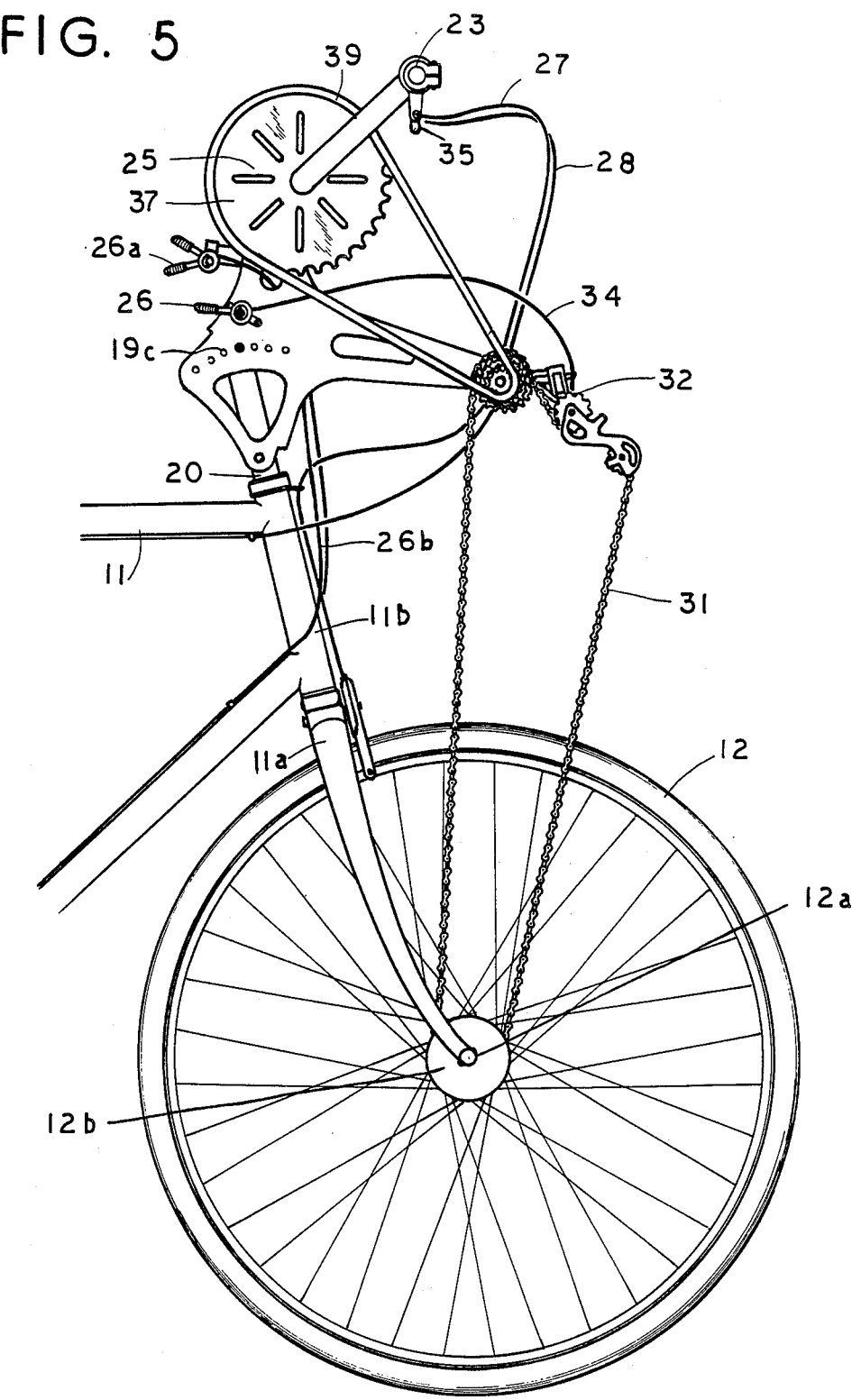
FIG. 5 is an enlarged right side view of the front of the embodiment of FIG. 1.

Referring now to FIGS. 1-5 of the drawings, the bicycle 10 has a frame 11 to which are attached a front wheel 12 and a rear wheel 13. Frame 11 has a fork 11a and a socket 11b into which handlebars are inserted in a conventional bicycle. Front wheel 12 is attached to fork 11a by hub 12a and has a sprocket 12b. Rear wheel 13 has a hub 13a and sprocket 13b. Seat 18 is mounted on the frame 11. Attached to the frame 11 are foot pedals 14 with associated gearing 15. A rear chain 16 connects gearing 15 with the rear derailleur 17 and foot pedals 14.

On the front of the frame 11 is an adjustable frame extension 20 to which are attached a pair of plates 19a and 19b which comprise the upper support 19. Support 19 can be adjusted by pivoting on pivot 19d until the desired position is obtained and then fixing that position by inserting a threaded bolt into the hole 19c which aligns with a upper hole in the extension 20.

Support 19 has in its upper portion a hub 21 to which are attached handles 22a comprising perpendicular arms 22 and handles 23 and which are connected to the axle of the gear wheel 24. Gear wheels 24 has spokes 25 and drives a chain 29 which is attached to the set of gears 30 which includes increasing size gears which in turn are selectively connected to a derailleur 32 and the sprocket 12b mounted on the hub 12a of the front wheel.

Hand control 33 for cable 34 to derailleur 32 permits the driver of the bicycle to shift the chain 31 to the selected one of the varying size available gears in gear set 30. Thus hand motion on handles 23 can be at selected speed to drive the front wheel. The brake control 35 mounted on one grip 23 connects cable 28 to the front wheel brake. The driver operates the rear wheel of the bicycle in a conventional manner having a brake control 36 mounted on the other grip 23 and rear wheel shifter 26 positioned on the upper support. Covers 37 and 38 are provided to protect the user from the mechanical parts of the wheel 24 and associated chain 29.

Figure 6:
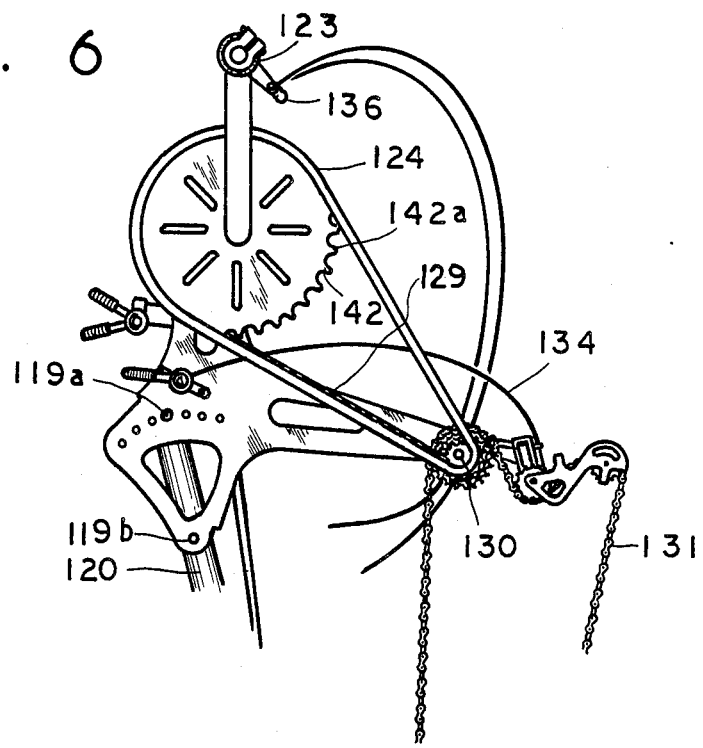
FIG. 6 is a right side view of the upper front of another embodiment of this invention.
Figure 7:
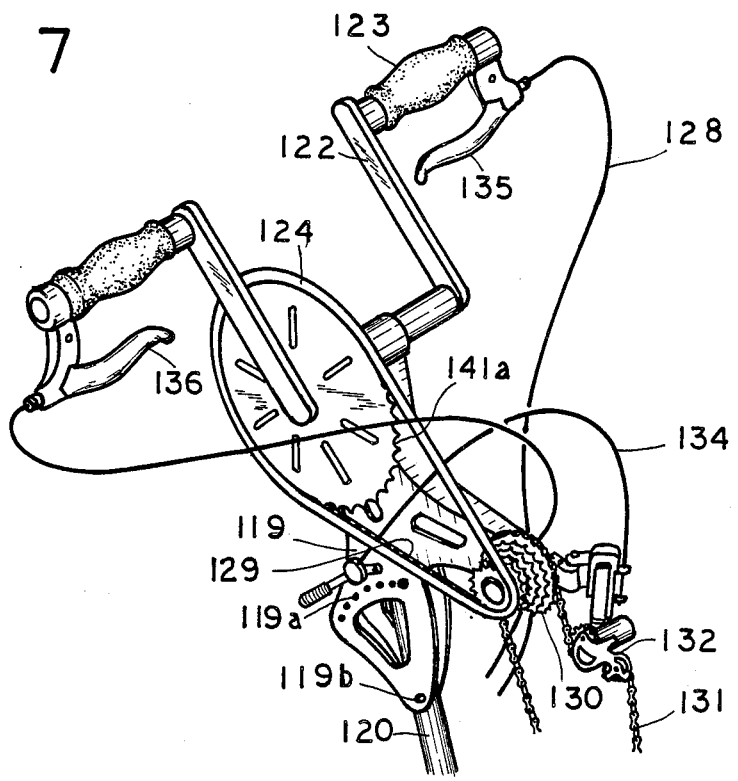
FIG. 7 is a front right three-quarter view of the embodiment of FIG. 6.
Figure 8:
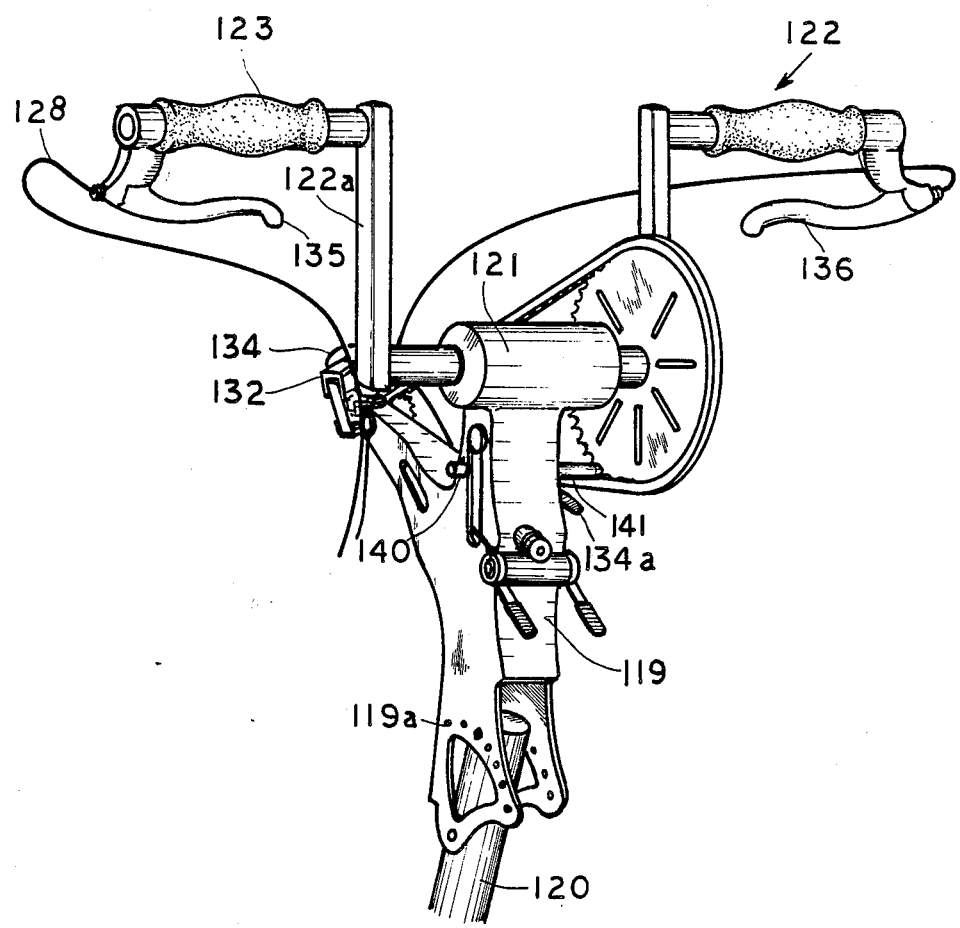
FIG. 8 is a left rear three-quarter view of the embodiment of FIG. 6.

Referring now to FIGS. 6-8 of the drawings, there is illustrated therein a different embodiment of the upper support and hand wheel, the frame, seat, and wheels being the same as in FIG. 1.

Upper support 119 is pivotally connected at 119b to adjustable frame extension 120 and is fixed into desired tilt by a bolt through a selected orifice 119a into the upper portion of extension 120. One portion of the support 119 has a hub 121 connected to a plate 138. A shaft and bearing extend through hub 121, connecting to arms 122 and handles 123 which drive gear wheel 124 on which chain 129 runs. Chain 129 operates said set of gears 130. Said set of gears 130 has gears selected by derailleur 132 to connect chain 131 with the front wheel drive gear 12a.

The gear wheel 124 has a plate 142 with spaced teeth 142a alternating with recesses 141a and an orifice 141. Bolt 140 is adapted to detachably extend through orifice 141 so as to engage a selected recess 141a. When so engaged the gear wheel 124 and handles are locked, as for example, in the position shown in FIG. 7. In such locked position, the handles 123 act as regular fixed handlebars, and the front wheel drive is rendered inactive.

Operation of the gear wheel by arms 122 and handles 123 causes chain 129 to drive the said set of gears 130. Operation of the derailleur 132 to change the gear for the front wheel driving chain 131 is accomplished by control 134a connected to the derailleur 132 by cable 134. The brake controls 135 and 136 for the front and rear wheels are mounted on separate handles 123.

I claim:

1. A velocipede, comprising:
   (a) an upper support means attached to the upper front of the frame;
   (b) a hand wheel mounted on said upper support means;
   (c) handle means which drive said hand wheel and are manually actuatable by the driver;
   (d) gear means mounted on said upper support means;
   (e) a loop connecting said hand wheel and said gear means, whereby rotation of said hand wheel causes rotation of said gear means;
   (f) locking means to detachably lock said hand wheel to said upper support means so that the handle means and the loop remain in fixed position;
   (g) a gear axially mounted on said front wheel;
   (h) a chain connecting said gear to said gear means, whereby said gear is rotatable with said handle means.

2. The velocipede of claim 1 wherein said locking means can selectively lock said hand wheel to said upper support means in a plurality of positions.

3. The velocipede of claim 2 further comprising a gear changing device mounted on said upper support, said gear changing device comprising a derailleur, wherein said chain connects said derailleur to said gear means and said gear.

4. A velocipede having a socket for mounting handlebars, comprising:
   (a) upper support means mounted on said socket;

(b) a gear mounted on said upper support means;

(c) handle means attached to said gear for rotating said gear, said handle means comprising first and second handles and associated with first and second handle arms, wherein said first and second handles are rotatably mounted on said handle arms, whereby said handles are rotatable independently of said gear;

(d) finger actuated brake levers and brake cables mounted on an outside surface of said handles, wherein cables mounted on said handles extend outwardly from said handles to provide for 360 degrees of handle rotation, whereby brake cable entanglement is avoided;

(e) a plurality of gears mounted on said upper support, wherein said gears are of different sizes;

(f) a gear changing device mounted on said upper support forward of said plurality of gears, said gear changing device comprising a derailleur;

(g) a first endless loop connecting said gear and said plurality of gears, whereby rotation of said handle means causes rotation of said plurality of gears;

(h) a front wheel having a gear axially mounted on the hub;

(i) a second endless loop connecting said axially mounted gear, said gear changing device and said plurality of gears; and (j) locking means to detachably lock said gear to said upper support means to provide fixed handlebars.

5. A velocipede having a front wheel drive in addition to a rear wheel driving comprising:
(a) a unitary upper support connected to an upper front of a bicycle frame where conventional handlebars are ordinarily attached;
(b) a gear wheel having handle means attached thereto mounted for rotation to said upper support;
(c) means for attaching an axle of said gear wheel to said support;
(d) means for attaching a plurality of gears;
(e) means for attaching locking means for said handle means;
(f) locking means attached to said means for attaching locking means, said locking means comprising a bolt adapted to detachably capture teeth in said gear wheel to restrict movement of the gear wheel.

6. A velocipede having a front wheel drive in addition to a rear wheel drive, comprising:
a unitary upper support connected to an upper upper front of a bicycle frame where conventional handlebars are ordinarily attached, wherein said upper support has a plurality of holes;
(b) an adjustable frame extension pivotally mounted on said upper support, whereby a plurality of fixed positions is provided, wherein said adjustable frame extension has holes which cooperate with a hole in said upper support, whereby a selected tilt of the upper support is achieved by a bolt inserted into a selected one of the plurality of holes and said holes which cooperate;
(c) a gear wheel having an axle and handle means attached thereto rotatably mounted to said frame extension above said means for attaching said support;
(d) means for attaching a plurality of gears, wherein said means for attaching a plurality of gears is located forward of said means for attaching said axle;
(e) means for attaching locking means for said gear wheel.

7. The apparatus of claim 6 wherein the means for attaching the locking means is an orifice located adjacent the means for attaching an axle, wherein said orifice is spaced from said means for attaching an axle, the space being a distance of about a radius of a gear wheel attached to said axle.

8. A velocipede having a front wheel drive in addition to a rear wheel drive, comprising:
(a) a gear wheel having handle means attached thereto mounted on an upper front of a bicycle frame at a place where conventional handlebars are typically located;
(b) a plurality of different sized gears mounted on said upper front forward of said gear wheel, said plurality of gears being connected to said gear wheel with a first drive chain;
(c) a gear axially mounted on a hub of a front wheel, said axially mounted gear being connected to said plurality of different sized gears by a second drive chain;
(d) a derailleur for changing position of the second drive chain on the plurality of different sized gears, said derailleur being located forward of said plurality of gears and attached to said upper front; and
(e) locking means for said gear wheel, whereby the handle means are fixed to provide for conventional handlebars.

9. The apparatus of claim 8 wherein said locking means is a detachable bolt which captures said gear wheel to prevent rotation of said gear wheel.

10. The apparatus of claim 9 wherein said locking means provides for a plurality of positions for locking said gear wheel, whereby said handle means are positionable relative to a driver.

11. The apparatus of claim 10 wherein said handle means comprises handle arms depending from opposite sides of said gear wheel, said handle arms having handles rotatably mounted on said handle arms.

12. The apparatus of claim 11 further comprising a finger actuated brake lever with associated brake cables mounted on each of said handles, wherein said brake cables extend outwardly from said handles, whereby said brake lever and associated brake cable do not become entangled.

13. The apparatus of claim 12 further comprising an upper support attached to said upper front, said upper support being attached to said gear wheel, plurality of different sized gears and derailleur.

14. A velocipede having a steering stem and a front wheel, comprising:
(a) an upper support means attached to the steering stem of the velocipede;
(b) a handwheel mounted on the upper support;
(c) handle means connected to the handwheel, said handle means comprising coextensive handles for driving and steering the front wheel;
(d) a plurality of different sized gears mounted on the upper support for changing gear ratios;
(e) a first loop connecting said hand wheel and said plurality of different sized gears, whereby rotation of said hand wheel causes rotation of said plurality of different sized gears;
(f) a gear axially mounted on said front wheel;
(g) a second loop connecting said gear to said plurality of different sized gears, whereby said gear is rotatable with said handle means.

15. The apparatus of claim 14 further comprising finger actuated brake levers and brake cables mounted on an outside surface of said handles, wherein cables mounted on said handles extend outwardly from said handles to provide for 360 degrees of handle rotation, whereby brake cable entanglement is avoided.

16. The apparatus of claim 14 further comprising locking means to detachably lock said hand wheel to said upper support means so that the handle means remained locked in place, whereby a plurality of fixed positions is provided.

17. A conversion kit for adding a front wheel drive to a velocipede having a steering stem and a front wheel, comprising:
(a) an upper support means attached to the steering stem of the velocipede for supporting a front wheel drive;
(b) a handwheel mounted on the upper support means;
(c) handle means connected to the handwheel, said handle means comprising coextensive handles for driving and steering the front wheel;
(d) a plurality of different sized gears mounted on the upper support for changing gear ratios;
(e) a first loop connecting said hand wheel and said plurality of different sized gears, whereby rotation of said hand wheel causes rotation of said plurality of different sized gears;
(f) a gear axially mounted on said front wheel;
(g) a second loop connecting said gear to said plurality of different sized gears, whereby said gear is rotatable with said handle means.

18. The apparatus of claim 17 further comprising finger actuated brake levers and brake cables mounted on an outside surface of said handles, wherein cables mounted on said handles extend outwardly from said handles to provide for 360 degrees of handle rotation, whereby brake cable entanglement is avoided.

19. The apparatus of claim 17 further comprising locking means to detachably lock said hand wheel to said upper support means so that the handle means remained locked in place.

20. The apparatus of claim 19 wherein said locking means can selectively lock said hand wheel to said upper support means in a plurality of positions.

* * * * *